US008396662B1

(12) United States Patent
Siira et al.

(10) Patent No.: US 8,396,662 B1
(45) Date of Patent: Mar. 12, 2013

(54) GHOST TRIP ELUCIDATION SYSTEM AND METHOD

(75) Inventors: Juhani Siira, Burnaby (CA); Michael Scott, Coquitlam (CA)

(73) Assignee: Webtech Wireless Inc., Burnaby, British Columbia (CA)

( * ) Notice: Subject to any disclaimer, the term of this patent is extended or adjusted under 35 U.S.C. 154(b) by 0 days.

(21) Appl. No.: 13/442,542

(22) Filed: Apr. 9, 2012

(51) Int. Cl.
*G01C 21/00* (2006.01)
*B60R 25/10* (2006.01)

(52) U.S. Cl. ..................................... 701/521; 340/426.1

(58) Field of Classification Search .................... 701/35, 701/29, 400–541; 340/439, 988–996; 307/10.1, 307/12, 10, 1
See application file for complete search history.

(56) References Cited

U.S. PATENT DOCUMENTS

2005/0285445 A1 * 12/2005 Wruck et al. ................ 307/10.1
2007/0038348 A1 * 2/2007 Larschan et al. ................ 701/35
2008/0255722 A1 * 10/2008 McClellan et al. ............ 701/35

* cited by examiner

*Primary Examiner* — James Trammell
*Assistant Examiner* — Muhammad Shafi
(74) *Attorney, Agent, or Firm* — John R. Flanagan

(57) ABSTRACT

Unauthorized use of fleet vehicles is detected by matching drivers' logged out times with vehicle movements for which there is no logged in driver. Allowance is made for vehicles that may be moved within permitted areas without a logged in driver. A likelihood value is assigned to each candidate driver whose logged out time corresponds to the duration of unauthorized movement of the vehicle. The likelihood value is increased if the candidate driver is the next driver to log into the vehicle after its unauthorized usage.

8 Claims, 1 Drawing Sheet

GHOST TRIP ELUCIDATION SYSTEM AND METHOD

TECHNICAL FIELD

The subject matter of the present invention relates to the field of wireless asset tracking and fleet operations management and, more particularly, is concerned with a ghost trip system and method for identifying candidate drivers and evaluating the likelihood of them having undertaken an unauthorized trip.

BACKGROUND ART

In many instances it is beneficial for one or more drivers to be identifiable with all movement of a vehicle, and for all of a driver's driving time to be tracked. One example is the Department of Transport's requirement for a driver's driving time to be tracked. Compliance with this may be achieved with an Hours of Service driver log. More generally a fleet of vehicles may work under a policy where drivers are not permitted to use the vehicle without oversight.

In transportation or fleet management, however, there is a problem of drivers making ghost trips in a vehicle. This may manifest in the detection of a vehicle moving, or having been moved, without any associated driver. For example, a driver may want to engage in a ghost trip. Before setting off, he may de-activate or log out of an on board recorder device, which is intended to associate drivers to a vehicle whenever the vehicle is in use. He would then engage in unauthorized activity, for example delivering a load for a third party, or use the vehicle for other personal vehicle use, neither of which are approved by the employer and/or owner of the vehicle.

SUMMARY OF THE INVENTION

As it would be useful to identify ghost trips, and identify drivers who may have engaged in such activity, the present invention discloses a system and method for detecting unauthorized use of vehicles, finding candidates who may have made such unauthorized use, and assigning a likelihood that each candidate actually made such use.

Disclosed herein is a method for elucidating ghost trips in a fleet of vehicles each equipped with a recorder, the method comprising the steps of: receiving, from one of said recorders in one of said vehicles, data representing a period of unauthorized movement of said one vehicle; determining, by a processor, durations for which each of a plurality of drivers were not logged into any of the vehicles; determining, by the processor, whether any of the durations include the period of unauthorized movement; and if one or more of the durations includes the period of unauthorized use, the processor assigning, to each driver to which said one or more durations correspond, a likelihood of being responsible for the unauthorized movement.

Also disclosed herein is a system for elucidating ghost trips in a fleet of vehicles, the system comprising: a plurality of vehicles each equipped with a movement detector for detecting movements of the vehicle and a recorder for recording detected movements of the vehicle and for recording driver log in and logout events; and a server comprising a processor and one or more non-transient computer readable media storing computer readable instructions, which, when processed by the processor, cause the processor to: receive, from one of said recorders in one of said vehicles, data representing a period of unauthorized movement of said one vehicle; determine durations for which each of a plurality of drivers were not logged into any of the vehicles; determine whether any of the durations include the period of unauthorized movement; and if one or more of the durations includes the period of unauthorized use, assign to each driver to which said one or more durations correspond, a likelihood of being responsible for the unauthorized movement.

Still further disclosed herein are one or more non-transient computer readable media storing computer readable instructions, which, when processed by a processor, cause the processor to perform steps, comprising: receiving, from a recorder in one of a plurality of vehicles each having a recorder, data representing a period of unauthorized movement of said one vehicle; determining durations for which each of a plurality of drivers were not logged into any of the recorders; determining whether any of the durations include the period of unauthorized movement; and if one or more of the durations includes the period of unauthorized use, assigning to each driver to which said one or more durations correspond, a likelihood of being responsible for the unauthorized movement.

BRIEF DESCRIPTION OF THE DRAWINGS

For clarity, the drawings herein are not necessarily to scale, and have been provided as such in order to illustrate the principles of the subject matter, not to limit the invention.

DESCRIPTION OF EMBODIMENTS

Figure 1:
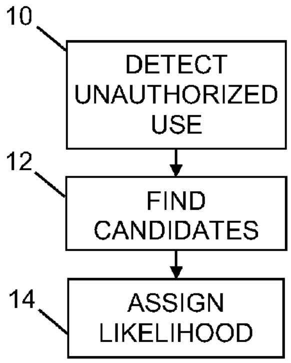
FIG. 1 is a flowchart of the process performed by the ghost trip elucidation system in accordance with the present invention.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the description is to be regarded in an illustrative, rather than a restrictive, sense.

Terminology

Movement Detector—A device installed in a vehicle that detects movement of the vehicle. A movement detector may be an odometer, a GPS device, or an engine control unit that includes a movement detector or receives input from one. It may detect ongoing motion of the vehicle, that the vehicle has moved since a prior moment in time, and/or that the vehicle is in a different location compared to a prior moment in time. The movement detector may be installed directly in the vehicle at the time of manufacture or it may be an accessory fitted later. It is feasible that other technologies may be used for the detection of vehicle movement.

Electronic On-Board Recorder (EOBR)—A device installed in a vehicle that allows drivers of the vehicle to log in and as a result become associated with the vehicle and its movements while logged in. An EOBR gathers and stores information from the vehicle's movement detector and can send information about the distance traveled, the time spent on site, etc. to a remote dispatcher or fleet manager. Back at the office, fleet managers can view the information sent in from the vehicles in real time, or the data can be stored for later reference. Drivers may enter their status, for example, as Off Duty, Sleeping, Driving, and/or On Duty. The EOBR may include a movement detector as described above. The EOBR may also include a clock and/or deduce time from GPS signals, in order to monitor the start time, end time and duration of each trip. An EOBR may also be known as a tachograph or a mobile data terminal. The EOBR may be referred to simply as a recorder, and such a recorder may record driver login and logout events as well as vehicle movements. In some cases, such a recorder may consist of two constituent recording devices: one for recording driver logins and logouts and the other for recording vehicle movements.

Landmark—A location or geofenced area. In the present context, landmarks are used to define areas in which vehicles may be moved without any particular driver being logged into them. For example, a maintenance yard may be a landmark, as may be a home depot.

The detailed descriptions that follow are presented partly in terms of methods or processes, symbolic representations of operations, functionalities and features of the invention. These method descriptions and representations are the means used by those skilled in the art to most effectively convey the substance of their work to others skilled in the art. A software implemented method or process is here, and generally, conceived to be a self-consistent sequence of steps leading to a desired result. These steps require physical manipulations of physical quantities. Often, but not necessarily, these quantities take the form of electrical or magnetic signals or values capable of being stored, transferred, combined, compared, and otherwise manipulated. It will be further appreciated that the line between hardware and software is not always sharp, it being understood by those skilled in the art that the software implemented processes described herein may be embodied in hardware, firmware, software, or any combination thereof. Such processes may be controlled by coded instructions such as in microcode and/or in stored programming instructions readable by a computer or processor.

Referring now to FIG. 1, there is shown a high level flowchart of the process performed by the system of the present invention. In step 10, unauthorized use of a fleet vehicle is detected. This is determined by detecting a period of time during which the vehicle has been moved outside of a landmark without having a driver logged into the EOBR. Next, in step 12, the system finds possible candidates for the unauthorized use, by analyzing the logged out times of drivers registered in the system, and selecting the drivers that have logged-out times corresponding to the period of unauthorized use. Finally, in step 14, the system assigns a likelihood value to each candidate. The value may be higher, for example, if a given driver has logged back into the same vehicle after it has been used for a ghost trip, without any other intervening drivers being logged in. The result is an identification of one or more candidates classified into either a higher or lower likelihood of having undertaken a specific ghost trip.

Figure 2:
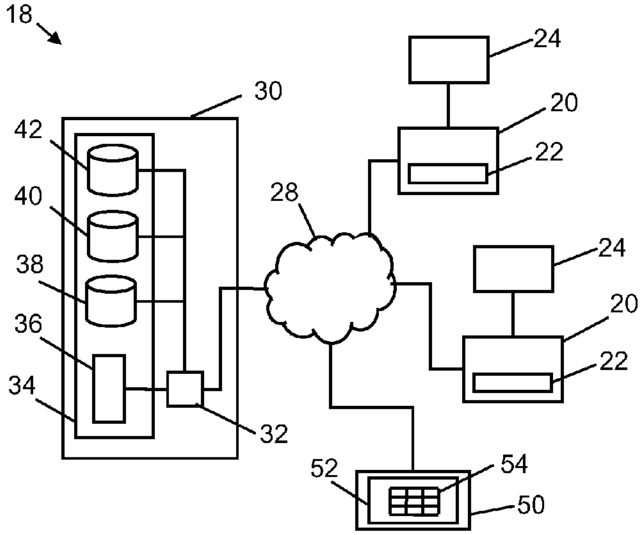
FIG. 2 is a schematic block diagram of the system.

Referring to FIG. 2, a schematic drawing of an embodiment of the ghost trip elucidation system 18 of the present invention is shown. The system comprises a plurality of EOBRs 20 each having an interface 22 through which a user may log in, log out, and optionally input various settings. Each EOBR 20 is fitted in a vehicle of a managed fleet of vehicles and connected to a movement detector 24 that detects movement of the vehicle. Signals from the movement detector 24, representing movement of the vehicles, are input to the EOBRs 20, which then transmit movement data, times and login data via a network 28 to a remote fleet management server 30. The network 28 may be the internet, a telecommunications network or a combination of both of these. The data may be transmitted in real time, in near real time, at regular intervals or at irregular intervals. The data may be stored in the EOBR 20 for later transmission as and when a communication link to the server 30 becomes available.

The fleet management server 30 has one or more processors 32 connected to computer readable memory 34, in which is stored computer readable instructions 36. The processor 32 may, for example, be a multi-core processor. Memory 34 may consist of one or more types of non-volatile computer readable media. The processor 32 processes the computer readable instructions 36, causing data in the transmissions received from the EOBRs 20 to be stored in driver and vehicle movement history database 38. A further, optional database 40 stores details of landmarks in which vehicles are authorized to be moved without having any driver logged in. Databases 38, 40 may be stored in memory 34 or other memory within or connected to the server 30.

The computer readable instructions 36 include an algorithm, which instructs the processor 32 (as explained in detail below with reference to FIG. 3) to analyse data from the databases 38, 40 in order to identify vehicle movement that is not in a landmark and for which no driver is, or was, logged in. Such unknown movements of vehicles are stored in database 42 in memory 34 or other memory in the server 30. Alternately, it is also possible for the unknown vehicle movements to be simply identified as such within database 38, by leaving the associated driver identification cell blank, or inserting "Unknown Driver" or the equivalent in it. Furthermore, the algorithm is configured to instruct the processor 32 to analyze the driver and vehicle movement history database 38 in order to identify drivers who could be responsible for the unknown vehicle movements. The identities of such candidate drivers may be stored in database 42, for example, or elsewhere in memory 34.

A fleet manager may access the server 30 directly or via a terminal 50 connected to the network 28. The terminal 50 may be, for example, a desktop computer, laptop computer or tablet computer, and may run a browser 52 or other interface application for accessing the ghost trip candidate data 42 and other data stored in the server 30, as well as possibly accessing the server 30 for general other fleet management purposes. The browser 52 may be configured to display the results returned by the algorithm in a table 54, which may tabulate the unknown vehicle identification and movements against the identities of candidate drivers. Other table and underlying database structures may alternately be used, for this and other databases disclosed herein.

Figure 3:
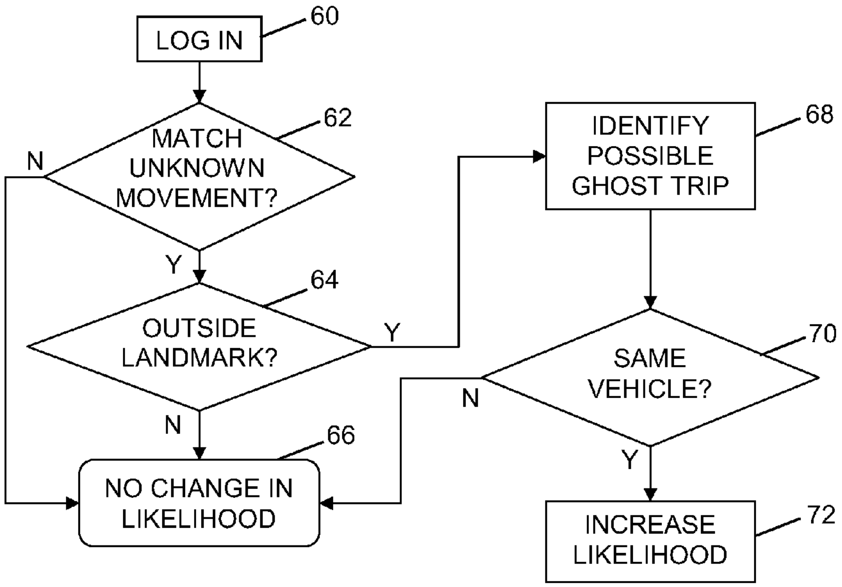
FIG. 3 is a more detailed flowchart of the process of an embodiment of the present invention.

The workings of the process controlled by the algorithm in server 30 of ghost trip elucidation system 18 are now explained in more detail with reference to FIG. 3. The fleet management server 30 stores in database 38 identities of the vehicles in the fleet and the identities of the drivers who have access to the vehicles. When a driver logs into a vehicle, in step 60, the system 18 can determine, from the driver's prior log out time, the duration of the driver's logged out time immediately prior to the log in at step 60. Based on the duration and time of occurrence of the logged out time, the system 18, in step 62 determines whether the driver's logged out time matches any of the unknown vehicle movements that have been recorded. Unknown movements of the vehicles may be detected based on GPS data or a jump in an odometer reading while no driver has been logged in. Basically, if the driver's logged out duration entirely overlaps the period of an unknown vehicle movement, then there is a match. A certain tolerance may be allowed to accommodate possible timing errors within the system.

If it is determined, in step 62, that there is a match between the driver's logged out duration and the duration of an unknown movement of any vehicle, then in step 64 the system 18 determines whether any part of the unknown movement was outside the landmarks, if any have been defined. If the unknown movement for a given vehicle was not outside the landmark(s), then it can be considered that the unknown movement was permitted and no ghost trip could have taken place. This would be the case if maintenance personnel had moved the given vehicle around in a maintenance yard. As a result, in step 66, there is no change in the likelihood that the driver undertook a ghost trip in the given vehicle, considering that before the driver logged in, the likelihood would have been zero. The process is repeated from step 62 for all vehicles for which there is a recorded unknown movement.

If it is determined, in step 62, that there is no match between the driver's logged out duration and the duration of any unknown movement of any vehicle, then the process moves to step 66. In this step, there is no change in the likelihood that the driver undertook a ghost trip in any vehicle, considering that before the driver logged in, the likelihood of the driver being responsible for any unknown movements would by default have been zero, or 'Not Possible'.

If it is determined in step 64 that the unknown movement of a vehicle matched to a driver's logged out duration has been at least partly outside a landmark, then it is possible that the driver undertook a ghost trip in the matched vehicle. As a result, the system 18 in step 68 identifies the driver as a candidate for the ghost trip in the matched vehicle. In this step, the likelihood of the driver actually undertaking the ghost trip may be set as 'Possible', 'Low Probability' or some other classification or numerical value. In step 70, the system 18 then determines whether the matched vehicle is the same one that the driver logged into in step 60. If it is, then it is considered more likely that the driver undertook the ghost trip, and the likelihood of the driver having undertaken the ghost trip is increased in step 72, for example, to 'Probable', 'High Probability' or some other classification or higher numerical value. If the vehicle logged into, in step 60, is not the same one that has been identified as having been used for a ghost trip by the driver, then the process moves to step 66, in which the likelihood of the driver having undertaken the ghost trip remains the same as set in step 68.

In step 70, the likelihood of a candidate may be also increased if the candidate was the last driver to be logged into the matched vehicle before the start of its unknown movement. If the candidate was the last driver to be logged into the matched vehicle before the ghost trip, and the first one to be logged in following the ghost trip, then the probability of the candidate may be increased twice, to result in 'Very High Probability', for example.

The match between a driver's logged out duration and a period of unknown movement may be determined according to a threshold. For example, if two drivers are candidates for a ghost trip and the logged out duration of a first driver is much longer than a second driver's, then the second driver may be considered to have a higher likelihood of undertaking the ghost trip. This may be considered to be especially true if either or both of the second driver's log out time or subsequent log in time is within a certain threshold, respectively, of the start or end of the period in which the ghost trip occurred. Numerical values of the likelihood may be assigned depending on how close the log out and log in times match the start and end of the ghost trip respectively.

As and when drivers log in, more data becomes available which can be sent to the fleet management server 30 to permit updates to the analysis of possible ghost trips. Alternately, the analysis may be made periodically, say every day, or every week, or as and when requested by a fleet manager. Either way, the system 18 correlates all the logged out driver durations with all unknown movements of the vehicles to detect possible ghost trips.

In another embodiment within the purview of the present invention, the test in step 64 as to whether the unknown movement is within or outside of a landmark may be performed before recording the movement as unknown. In this case, the flowchart will move directly from step 62 to step 68 if there is a match between a driver's logged out time and an unknown movement of a vehicle.

A disconnection of an EOBR may be considered as a log out. Such a disconnect event may be determined by an odometer jump detected when the EOBR is reconnected.

For the purposes of this invention, a driver logged in as 'Off Duty' may be considered to be a log out, as it would be possible for a driver to engage in a ghost trip while supposedly taking a break. This would apply in cases where the recorder does not automatically change a driver's status to DRIVING when vehicle motion is detected.

The likelihood metrics may be applied as a classification selected from None, Low or High, or they may be represented as numerical values. More sophisticated rules for analysis may be developed and included in the system.

Although the present invention has been illustrated principally in relation to vehicles subject to fleet management, it also has application in respect of other movable assets that have a user login. For example, the invention could be applied to aircraft and boats.

In the description herein, embodiments disclosing specific details have been set forth in order to provide a thorough understanding of the invention, and not to provide limitation. However, it will be clear to one having skill in the art that variations to the specific details disclosed herein can be made, resulting in other embodiments that are within the scope of the invention disclosed. Steps in the flowcharts may be performed in a different order, other steps may be added, or one or more may be removed without altering the main function of the system. All values, parameters, and configurations described herein are examples only and actual values of such depend on the specific embodiment. Accordingly, the scope of the invention is to be construed in accordance with the substance defined by the following claims.

What is claimed is:

1. A system for elucidating ghost trips in a fleet of vehicles, the system comprising:
- a plurality of vehicles each equipped with a movement detector for detecting movements of the vehicle and a recorder for recording detected movements of the vehicle and recording driver login and logout events; and
- a server comprising a processor and one or more non-transient computer readable media storing computer readable instructions, which, when processed by the processor, cause the processor to:
  - receive, from one of said recorders in one of said vehicles, data representing a period of unauthorized movement of said one vehicle;
  - determine durations for which each of a plurality of drivers were not logged into any of the vehicles;
  - determine whether any of the durations include the period of unauthorized movement; and
  - if one or more of the durations includes the period of unauthorized use, assign to each driver to which said one or more durations correspond, a likelihood of being responsible for the unauthorized movement.

2. The system of claim 1 wherein the unauthorized movement is movement of said one vehicle while no driver is logged into said one recorder.

3. The system of claim 2 wherein the unauthorized movement is determined by the processor to be movement outside of a landmark.

4. The system of claim 1 wherein one or more of the movement detectors is a GPS device or an odometer.

5. The system of claim 1 wherein the instructions, when processed by the processor, further cause the processor to:

if one of the drivers with an assigned likelihood has logged into said one vehicle after the period of unauthorized movement, without any other drivers having logged in to said one vehicle after the unauthorized movement and before said one driver's logging in, increase said one driver's assigned likelihood.

6. The system of claim 1 wherein the instructions, when processed by the processor, further cause the processor to:

if one of the drivers with an assigned likelihood logged out of said one vehicle before the period of unauthorized movement, without any other drivers having logged in to said one vehicle after said one driver's logging out and before the unauthorized movement, increase said one driver's assigned likelihood.

7. The system of claim 1 wherein the instructions, when processed by the processor, further cause the processor to send to a remote terminal for display thereon:

details of the unauthorized movement;

identification of each driver with an assigned likelihood of being responsible for the unauthorized movement; and values of the assigned likelihoods.

8. The system of claim 1 wherein the vehicles are either land-borne, airborne or sea-borne.

* * * * *